2,969,118

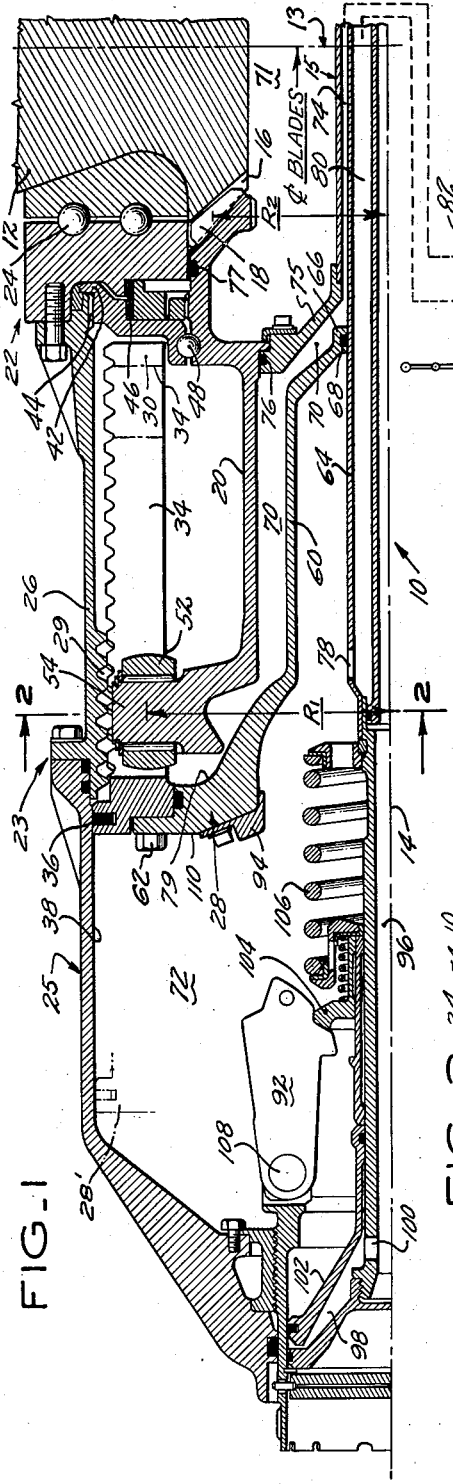
Jan. 24, 1961     A. N. ALLEN, JR     2,969,118
MOTOR UTILIZING COMBINED ACTION OF SPLINES AND CAMS
Filed Aug. 21, 1957
INVENTOR
ARTHUR N. ALLEN, JR.
BY Vernon F. Hauschild
ATTORNEY United States Patent Office 2,969,118
Patented Jan. 24, 1961

MOTOR UTILIZING COMBINED ACTION OF SPLINES AND CAMS

Arthur N. Allen, Jr., Wethersfield, Conn., assignor to United Aircraft Corporation, East Hartford, Conn., a corporation of Delaware Filed Aug. 21, 1957, Ser. No. 679,382

7 Claims. (Cl. 170—160.32)

This invention relates to propellers and more particularly to hydraulically operated variable pitch propellers adapted for aircraft use.

It is an object of this invention to provide a propeller blade pitch angle changing mechanism which will provide maximum blade rotating torque in regions of maximum resistance to blade rotation and which will provide maximum blade rotational speed in regions of less resistance to blade rotation, and in particular in the zero degree pitch angle region.

It is an object of this invention to provide a combination of helical or spiral spline rotating means and cam slot rotating means to accomplish this objective such that the combined algebraic sum of the spline rate and cam rate will be felt as the total rotational rate at the blades.

It is a further object of this invention to provide a blade rotating mechanism utilizing a load carrying roller engaging a properly contoured cam slot, which roller is located the maximum possible distance from the propeller longitudinal axis so as to provide the maximum blade turning moment for a given cam roller loading.

It is a further object of this invention to provide a hydraulically operated blade rotating mechanism which permits variation of the blade rotating torque for a given blade angle position and hydraulic operating pressure.

Other objects and advantages will be apparent from the following specification and claims, and from the accompanying drawings which illustrate an embodiment of the invention.

In the drawing:

Fig. 1 is a cross sectional showing of an hydraulically operated, variable pitch propeller unit utilizing the spiral spline and contoured cam roller rotating mechanism taught in this invention.

Fig. 2 is a cross sectional showing taken along line 2—2 of Fig. 1.

Fig. 3 is an external showing of the slotted rotating piston, with external parts removed, to illustrate the spiral splines and the cam contouring.

It is a well known characteristic of propeller blades that if left to seek their own position in rotation, the blades would go to zero degree pitch where the propeller would offer least resistance to engine torque and thus permit the engine to increase in speed to the point where destruction would be probable. It is a further well known characteristic of propeller blades that the twisting moment, induced in the blade by rotation (engine), is a minimum at the 90° or full feather position and again at the zero degree pitch position and varies substantially sinusoidally therebetween, such induced blade twisting tendencies being in the direction of zero blade angle. This application teaches blade rotating mechanism which changes the pitch of the propeller blades at a high rate in regions of zero pitch where least resistance to engine torque exists and in the feathering range.

It is desirable to avoid blade hesitation in passing through zero pitch position as the engine torque cannot be supported without increase in speed in this region. In the feathering region it is also desirable to increase the rate of blade motion. Since, as explained previously, resistance to blade rotation is minimum in the zero pitch and feather regions, our mechanism is capable of producing increased blade rotational speed in these regions without an increase in actuating force. Further, due to the varying angularity of our cam track, our blade rotating mechanism may be shortened and hence lightened.

Referring to Fig. 1, we see propeller unit 10 which is of the hydraulically operated, variable pitch type disclosed in United States Patent Nos. 2,174,717, 2,663,373, 2,703,148 and 2,704,583 and which comprises a plurality of propeller blades 12 which extend radially from and rotate about longitudinal axis 14 of propeller unit 10. Blades 12 carry beveled turning gears 16 at their inner ends which mate with and are caused to rotate by beveled ring gear 18 of rotating sleeve 20. Blade hub 22 supports and positions blades 12, but the parts are capable of relative rotational movement about blade axis 13 due to bearings 24. Dome unit 23 projects from hub 22 and forms a cylinder and piston unit. The cylinder unit 25 comprises outer or outboard cylinder or sleeve 26 which acts as a hydraulic cylinder in which piston unit 28 is caused to translate and rotate in response to hydraulic pressures to effect the rotation of blades 12. Outer case or cylinder 26 has spiral splines 29 on its inner surface at its blade end. Intermediate sleeve or cylinder 30 has spiral splines 32 on its outer surface which engage and mate with inner splines 29 of outer sleeve or cylinder 26. Accordingly, translation of sleeve 30 along axis 14 causes the constant rate rotation of sleeve 30 due to the spiral spline action. Sleeve 30 also has at least one contoured cam slot 34 therein, which cam slot is of the contour shape shown in Fig. 3. There are preferably several such cam slots 34 to diminish the load carrying demands on each. Sleeve 30 carries piston type seal 36 at its forward end, which bears against the smooth inner surface 38 at the anti-blade end of dome cylinder 25 and moves substantially from the position shown in solid lines in Fig. 1 to the position shown in phantom and designated as 28' in Fig. 1. Due to the actuation of piston unit 28, sleeve or cylinder 30 will translate along longitudinal propeller axis 14, as well as rotate about this axis.

Connecting means 42 attaches to both dome outer sleeve 26 and hub 22 through spline units 44 and 46, such that dome cylinder unit 25 is fixed to hub 22 and must rotate therewith. Connecting means 42 carries bearing 48, which bearing also engages and axially positions gear carrying sleeve 20 such that sleeve 20 may rotate only. Sleeve 20 carries bevelled ring gear 18 at one of its ends and carries a plurality of bearings or rollers 52 at its other end. Bearings 52 rotate about radially extending spuds 54 and are received in contoured grooves or slots 34 of sleeve 30. Rollers 52 engage the side surfaces 56 and 58 of cam slots 34 to impart a rotational motion to sleeve 20 in response to the axial movement of sleeve 30 carrying cam slot 34.

Sleeve 30 is joined to inner piston sleeve 60 to form piston unit 28 by attachment means 62 which may be of any convenient type, such as bolts and is attached for relative motion with respect to central tube unit 64 by a loose fitting web or skirt 66. Seal 68 extends between tube unit 64 and piston web 66. Seal 68 provides a seal between chambers 70 and 72, which are formed on opposite sides of piston unit 28. Sleeve 20 is connected to pipe unit 15 by any convenient means, such as stationary flange 75 which engages rotating sleeve 20 through seal 76. Seal 77 is provided between sleeve 20 and hub 22 to isolate chamber 70 from barrel unit 71.

It will be noted that as piston unit 28 moves with respect to dome cylinder unit 25, central sleeve 30 is caused to rotate with respect to the outer sleeve 26 at a constant rate by the coaction between spiral splines 29 and 32. Sleeve 20 is caused to rotate at a varied rate of speed from sleeves 30 and 60 of piston 28 due to the combined action of rollers 52 in contoured cam slots 34 and the total response of rotation of sleeve 20 to translation of piston unit 28 being the combined rate of rotation due to spiral splines 29, 32, and cam slot 34.

In the position shown in solid in Fig. 1, blades 12 are in their feathered or 90° position and offer little resistance to rotation. When piston unit 28 gets to the position shown in phantom in Fig. 1 as 28′, the blades 12 would have rotated through the potentially destructive zero degree position to a reverse pitch position.

Let us consider that we wish to move piston unit 28 from the feather or 90° position to a reverse pitch position. Hydraulic actuating fluid will be supplied from a pressure source through line 74 to chamber 70 such that it fills chamber or cavity 70 and acts against the rear surface 79 of piston unit 28 to force piston unit 28 to move leftwardly. Piston unit 28 is permitted to move toward the left because the actuating fluid in cavity 72 is returned to supply through aperture 78 and line 80. Both lines 74 and 80 are a part of tube unit 64 and may be annular in shape about axis 14. Obviously, if we wish to hold blades 12 in any given pitch angle position, a valve, such as pilot operated valve 82 may be placed across lines 74 and 80 to fixedly position piston unit 28 and, therefore, blades 12.

As piston unit 28 begins to move toward the left in Fig. 1, a constant relative rotation for full piston stroke is established between sleeve 26 and sleeves 30 and 20 by the spiral spline action and a further or additional varying rate relative rotation is caused between sleeves 30 and 20 by cam action so that the propeller blades are rotated at a varying rate which is the algebraic sum of the constant rate spline action and the varying rate cam slot and roller action.

With respect to this relative rotation between sleeves 30 and 20, it will be noted that during early travel of piston 20 from full feather position, roller 52 will travel from points 84 to 86 of cam slot 34, as best shown in Fig. 3. Due to the steepness of the cam slot angle relative to axis or centerline 14 between these points, sleeve 20 and, therefore, blades 12 will be caused to rotate at a high speed during this region of travel. Because blade resistance to rotation is low in this area, rapid blade rotation is desirable and may be accomplished without unduly loading the actuating parts, such as the splines 28 and 32 and roller 52 and spud 54 or splines 28—32. During the next region of its travel, that is between points 86 and 88 of contoured cam slot 34, it will be noted that the cam angle relative to axis 14 is diminished drastically such that the speed of rotation of blades 12 is drastically reduced. This is highly desirable since the blades are passing through regions of maximum torque resistance to blade rotation as rollers 52 pass from point 86 to point 88 of cam slot 34. Accordingly, but a very slight additional rotation is added by cam action to the rotational effects caused by the spiral splines and the speed of blade rotation is at a minimum in the region between points 86 and 88 of cam 34. It will be noticed here that the rollers 52, which are a critically loaded mechanism, are located a substantial distance $R_1$ from axis 14 and that distance $R_1$ is a greater distance from axis 14 than is the central contact between gears 18 and 16, that is, $R_2$. Since the moment between gears 16 and 18 needed to rotate blades 12 is equal to the moment between roller 52 and sleeve 30, it is highly desirable to have radial distance $R_1$ a maximum so that roller 52, a poor load carrying member, is loaded minimally. After passing through this area of high moment resistance to blade rotation, roller 52 will then pass between points 88 and 90 of contoured cam slot 34. It will be noted that there is again a steep angle in cam slot 34 relative to axis 14 between points 88 and 90 and we will, therefore, be causing sleeve 20 to rotate at a high rate of speed with respect to sleeve 30. Since we are now approaching the potentially destructive zero degree blade angle position, it is highly desirable to rotate through this zero degree blade angle region at maximum speed.

It will be noted that by the alternate steep and flat angular contouring of cam slot 34, relative to axis 14, we have accomplished the desirable function of varying the torque being exerted to cause blade rotation for a given actuating pressure acting to move piston unit 28. In this fashion, we can cause our blades to rotate through the blade angle range at desired rates.

It will be noted by referring to Figs. 1 and 2 that the contact area between roller 22 and cam slots 34 are immediately adjacent the area of spline contact between outer case 26 and sleeve 30 and hence receives support therefrom.

Normally, low pitch stops 92 will be in the position shown in Fig. 1 and, by abutting bumper 94 of piston unit 28, will prevent piston unit 28 from moving blades 12 beyond a preselected minimum pitch angle, which minimum pitch angle is chosen to be of safe angularity from the destructive zero degree pitch angle. When the pilot wishes to go to reverse pitch, he provides hydraulic actuating fluid through low pitch stop line 96 which enters chamber 98 through aperture 100 to cause piston 102 to move to the right, thereby moving stop restriction 104 to the right against the urging of spring 106. This will permit piston 28 to cause low pitch stop 92 to pivot clockwise about pivot point 108 and permit piston 28 to move to the position shown in phantom in Fig. 1 at 28′. This is maximum reverse pitch position.

When the pilot wishes to go from this maximum reverse pitch position to the feather position, he will no longer supply actuating fluid through the low pitch stop line 96 for the low pitch stops 92 are being held inwardly by piston 28. The pilot will cause actuating fluid to pass through line 80 and aperture 78 into cavity 72 at the same time that he opens line 74 and cavity 70 to scavenge or drain to fluid supply. The hydraulic fluid in chamber 72 will act upon the entire surface 110 of piston unit 28 to move piston unit 28 to the right as the hydraulic fluid in chamber 70 will return to supply through line 74. Spiral spline action will provide constant relative rotation between sleeve 26 and sleeves 30, 20, and 60 during full piston stroke. During initial travel, in passing between points 90 and 88, blades 12 will be caused to rotate through the destructive zero degree pitch position at a rapid speed by the combined action of spiral splines 29 and 32 together with the cam action of cam slot 34. which is at a high pitch angle and, therefore, effects high rotational blade velocity between points 90 and 88 or cam 34. As rightward motion of piston 28 continues and roller 52 passes between point 88 and 86 of contoured cam 34, the rate of blade rotation will reduce due to the small degree of angular pitch in cam slot 34. In this region of blade rotation, namely between points 88 and 86, blades 12 are rotated against high torque resistance but low speed and are, therefore, able to withstand the maximum moments of resistance to blade rotation. As rightward movement of piston 28 continues, roller 52 travels from point 86 to 84 in contoured cam 34 at a high rate of blade rotation due to the combined effects of the spiral splines 32 and 29 and the high pitch of contoured cam 34 between points 86 and 84.

In this fashion, spiral splines and contoured cams have been used to effect propeller blade rotation in such a fashion that low torque and high rotational speed are applied to the blade at regions of low resistance to blade rotation including the potentially destructive zero degree pitch angle. Further, maximum torque is provided at the sacrifice of blade rotational speed, to overcome the maximum moments of resistance to blade rotation encountered between the blades' zero degree and feather positions.

We have further accomplished minimum loading of the roller 52 used in cam 34 by placing it a maximum distance from the propeller longitudinal axis 14.

It is to be understood that the invention is not limited to the specific embodiments herein illustrated and described, but may be used in other ways without departure from its spirit as defined by the following claims.

I claim:

1. Propeller apparatus comprising propeller blades mounted for rotation on a hub, means to rotate said blades relative to said hub comprising apparatus effecting rotation firstly by spiral spline coaction and secondly and additionally by irregularly contoured cam slot and roller coaction.

2. Apparatus for rotating a propeller blade comprisng three concentric sleeves, namely an outer sleeve, a central sleeve and a rotatable propeller rotating inner sleeve with a spiral spline connection between the outer and central sleeves and a roller and irregularly contoured cam slot connection between the propeller rotating inner sleeve and said central sleeve, and means to move said central sleeve with respect to said outer and inner sleeves so that said inner sleeve is rotated with respect to said outer sleeve due to both spline and cam slot action.

3. Apparatus for rotating a propeller blade comprising three concentric sleeves, namely an outer sleeve, a central sleeve and a rotatable propeller rotating inner sleeve with a spiral spline connection between the outer and central sleeves and a cam slot and roller connection between the propeller rotating inner sleeve and said central sleeve, and means to move said central sleeve with respect to said outer and inner sleeves so that said inner sleeve is rotated with respect to said outer sleeve at a constant rate of rotation due to spline action and rotated additionally algebraically at varying rates of rotation due to cam action.

4. In a variable pitch propeller having an axis, at least one propeller blade projecting radially from said axis and having a turning gear at its inner end, a hub supporting said blade for rotation, a dome unit comprising an outer sleeve attached for rotation with said hub and having spiral splines on its inner surface, a second sleeve having spiral splines on its outer surface mating with the said spiral splines of said outer sleeve and also having an axially extending slot therein which slot varies angularly with respect to said propeller axis, a third sleeve mounted for rotation only and having a gear engaging said blade turning gear and further having a roller unit projecting therefrom and received in said slot immediately adjacent the spiral spline connection between said outer and second sleeves, and means to move said second sleeve axially with respect to said outer sleeve to cause rotation of said second and third sleeves relative to said outer sleeve due to spline action and to cause added rotation and at varying rates between said second and third sleeves so that said third sleeve drives said blade in rotation at varying rates.

5. In a variable pitch propeller having an axis, a plurality of equally spaced propeller blades projecting radially from said axis and each having a turning gear at its inner end, a hub supporting said blades for rotation, a dome unit forming a cylinder and piston and comprising an outer sleeve forming said cylinder and attached for rotation with said hub and having an inner surface with spiral splines at its blade end and being smooth surfaced at its anti-blade end, said piston located within said cylinder and comprising a second sleeve having spiral splines on its outer surface mating with the said spiral splines of said outer sleeve and also having a plurality of axially extending cam slots therein which slots are identical and vary angularly with respect to said propeller axis and having a skirt extending toward said axis and forming a chamber within said cylinder on each side thereof, a third sleeve which is mounted on said hub for rotation only and having a drive gear engaging said blade turning gears and further having a plurality of roller units projecting radially outwardly therefrom so that said roller units are at a greater radius from said axis than is said drive gear and with each of said roller units received in one of said slots immediately adjacent the spiral spline connection between said outer and second sleeves, and means to selectively provide actuating fluid to one of said chambers to move said piston axially with respect to said cylinder to cause constant rate rotation of said second and third sleeves relative to said outer sleeve due to spline action and to cause added varying rate rotation between said piston and said third sleeve due to cam action so that said third sleeve rotates said blade at varying rates.

6. In a variable pitch propeller having an axis, a plurality of equally spaced propeller blades projecting radially from and rotatable about said axis and each having a turning gear at its inner end, a hub supporting said blades for rotation, a dome unit forming a cylinder and piston and comprising an outer sleeve forming said cylinder and attached for rotation with said hub and having an inner surface with spiral splines at its blade end and being smooth surfaced at its anti-blade end, said piston located within said cylinder and comprising a second sleeve having spiral splines on its outer surface mating with the said spiral splines of said outer sleeve and also having a plurality of axially extending cam slots therein which slots are identical and vary angularly with respect to said propeller axis to be of substantial angularity at both of its ends to effect maximum blade rotation rate at the feather and zero pitch regions and of minimal angularity therebetween to effect maximum blade rotation torque in the region of high resistance to blade rotation, and having a skirt extending toward said axis and forming a chamber within said cylinder on each side thereof, a third sleeve mounted on said hub for rotation only and having a gear engaging said blade turning gears and further having a plurality of roller units projecting radially therefrom with each received in one of said slots, said roller units and said cam slots located adjacent said dome cylinder inner surface to effect maximum load moment distance from said axis, and means to selectively provide actuating fluid to one of said chambers to move said piston axially with respect to said cylinder to cause constant rate rotation between said piston and third sleeve relative to said cylinder due to spline action and to cause added varying rate rotation between said piston and said third sleeve so that said third sleeve rotates said blade at rates which are the algebraic sum of said constant rate and said varying rate rotation.

7. In a variable pitch propeller having an axis, a plurality of equally spaced propeller blades projecting radially from and rotatable about said axis and each having a turning gear at its inner end, a hub supporting said blades for rotation, a dome unit forming a cylinder and piston and comprising an outer sleeve forming said cylinder and attached for rotation with said hub and having an inner surface with spiral splines at its blade end and being smooth surfaced at its anti-blade end, said piston located within said cylinder and comprising a second sleeve having spiral splines on its outer surface mating with the said spiral splines of said outer sleeve and also having a plurality of axially extending cam slots therein which slots are identical and vary angularly with respect to said propeller axis to be of substantial angularity at both of its ends to effect maximum blade rotation rate at the feather and zero pitch regions and of minimal angularity therebetween to effect maximum blade rotation torque in the region of high resistance to blade rotation and having a skirt extending toward said axis and forming a chamber within said cylinder on each side thereof, a third sleeve mounted on said hub for rotation only and having a gear engaging said blade turning gears and further having a plurality of roller units projecting radially therefrom with each received in one of said slots, said roller units and said cam slots located adjacent said dome cylinder inner surface to effect maximum load moment distance from said axis, a tube unit extending along said axis and sealably engaging said skirt and means to selectively provide constant pressure source actuating fluid thru said tube unit to one of said chambers while draining displaced fluid from the other of said chambers thru said tube unit to move said piston axially with respect to said cylinder to cause constant rate rotation of said piston and third sleeve relative to said cylinder due to spline action and to cause added varying rate rotation between said piston and said third sleeve due to cam action so that said third sleeve rotates said blade at rates which are the algebraic sum of said constant rate and said varying rate rotation, means to retain said blades in any selected rotary position, means to limit piston travel, and means to inactivate said piston travel limiting means.

References Cited in the file of this patent

UNITED STATES PATENTS

| | | |
|---|---|---|
| 2,174,717 | Caldwell | Oct. 3, 1939 |
| 2,416,541 | Olman | Feb. 25, 1947 |
| 2,696,270 | Nichols | Dec. 7, 1954 |
| 2,715,447 | Kelson | Aug. 16, 1955 |
| 2,792,064 | Smith | May 14, 1957 |

FOREIGN PATENTS

| | | |
|---|---|---|
| 629,540 | Great Britain | Sept. 22, 1949 |